United States Patent
Chiu et al.

(10) Patent No.: US 7,027,441 B2
(45) Date of Patent: Apr. 11, 2006

(54) INDEXING METHOD FOR MAPPING MULTIPLE SEGMENTS OF CODED FIELDS INTO A TABLE-STRUCTURE FIELD

(75) Inventors: Meng-Hsi Chiu, Tainan (TW); Kim-Joan Chen, Min-Shiung Shiang (TW); Ching-Lung Chang, Douliu (TW); Ting-Chao Hou, Min-Shiung Shiang (TW); Yu-Cheng Kung, Douliu (TW)

(73) Assignee: National Science Council, Taipei (TW)

( * ) Notice: Subject to any disclaimer, the term of this patent is extended or adjusted under 35 U.S.C. 154(b) by 996 days.

(21) Appl. No.: 09/767,191

(22) Filed: Jan. 22, 2001

(65) Prior Publication Data

US 2003/0048788 A1 Mar. 13, 2003

(30) Foreign Application Priority Data

Jul. 3, 2000 (TW) .................................... 89113261 A (51) Int. Cl.
*H04L 12/28* (2006.01)
*H04L 12/56* (2006.01)

(52) U.S. Cl. .................................... 370/392; 370/395.1
(58) Field of Classification Search ............ 370/389, 370/392, 395.1, 397, 399, 401
See application file for complete search history.

(56) References Cited

U.S. PATENT DOCUMENTS

| | | | | |
|---|---|---|---|---|
| 5,323,389 A | | 6/1994 | Bitz et al. | 370/60 |
| 5,936,959 A | | 8/1999 | Joffe | 370/397 |
| 6,034,958 A | * | 3/2000 | Wicklund | 370/395.32 |
| 6,044,077 A | | 3/2000 | Luijten et al. | 370/392 |
| 6,097,725 A | * | 8/2000 | Glaise et al. | 370/395.32 |
| 6,327,261 B1 | * | 12/2001 | Makoua et al. | 370/392 |
| 6,556,570 B1 | * | 4/2003 | Delattre et al. | 370/395.31 |

OTHER PUBLICATIONS

IDT77211 NICStAR™ User Manual, Version 1.0 Released Edition Feb. 26, 1997 (Table of Contents pp. i–vi, Manual pp. 1–174, and Index pp. 1–5).

* cited by examiner

*Primary Examiner*—Chau Nguyen
*Assistant Examiner*—Andrew Wahba
(74) *Attorney, Agent, or Firm*—Birch, Stewart. Kolasch & Birch, LLP (57) ABSTRACT

An indexing method for mapping multiple segments of coded fields in a table structure. The indexing method can complete resolving address mapping within a short delay, and has a collision-free characteristic when total bit-width of variation for coded fields is the same as the bit-width of the table. The method can be used to resolve Virtual Path Identifier/ Virtual Channel Identifier (VPI/VCI) mapping for Asynchronous Transfer Mode (ATM) technologies.

7 Claims, 8 Drawing Sheets

FIG. 7 m Sectional Encoding Structure Implemented By The Method Of The Invention

$$(A_{m-1_{n-1}}, A_{m-1_{n-2}}, \ldots, A_{m-1_{n-k_0}}, A_{0_{n-k_0-1}}, A_{0_{n-k_0-2}}, \ldots, A_{0_{n-(\sum_{i=0}^{m-2}k_i)}}, A_{0_{n-(\sum_{i=0}^{m-2}k_i)-1}}, A_{0_{n-(\sum_{i=0}^{m-2}k_i)-2}}, \ldots, A_{0_0})$$

$$\oplus$$

$$(A_{1_{n-1}}, A_{1_{n-2}}, \ldots, A_{1_{n-k_0}}, A_{m-1_{n-k_0-1}}, A_{m-1_{n-k_0-2}}, \ldots, A_{m-1_{n-(\sum_{i=0}^{m-2}k_i)}}, A_{1_{n-(\sum_{i=0}^{m-2}k_i)-1}}, A_{1_{n-(\sum_{i=0}^{m-2}k_i)-2}}, \ldots, A_{1_0})$$

$$\oplus \quad . \quad . \quad . \quad \oplus$$

$$(a_{0_{n-1}}, a_{0_{n-2}}, \ldots, a_{0_{n-k_0}}, a_{1_{n-k_0-1}}, a_{1_{n-k_0-2}}, \ldots, a_{1_{n-k_0-k_1}}, \ldots, a_{m-2n-(\sum_{i=0}^{m-2}k_i)},$$
$$a_{m-1n-(\sum_{i=0}^{m-2}k_i)-1}, a_{m-1n-(\sum_{i=0}^{m-2}k_i)-2}, \ldots, a_{m-1_0})$$

FIG. 8

Two-Sectional Encoding Structure Values $\vec{A}_i'''$ where:

$i = 0, 1,$ the value of each encoding structure is, $\min(\vec{A}_i''') \leq \vec{A}_i''' \leq \max(\vec{A}_i''')$, and $k_i$ satisfies the following formula:

$2^{k_i - 1} < (\max(\vec{A}_i''') - \min(\vec{A}_i''') + 1) \leq 2^{k_i}$

INDEXING METHOD FOR MAPPING MULTIPLE SEGMENTS OF CODED FIELDS INTO A TABLE-STRUCTURE FIELD

FIELD OF THE INVENTION

The invention presents a brand-new method Virtual Path Identifier/Virtual Channel Identifier (VPI/VCI) connection identification for an Asynchronous Transfer Mode (ATM) network. It can also be applied on ATM switches in collaboration with Shared Memory. The connection amount supported by each input port can be effectively adjusted via control of the index table memory at a fixed size of the shared memory.

BACKGROUND OF THE INVENTION

Every ATM connection is distinguished by VPI/VCI in an ATM network. With faster and faster transmitting speed, the receivers of ATM network, limited by only 53 bytes of each cell, has to complete each VPI/VCI recognition and processing in a very short period of time. At the receiver of a network interface card, cells should be successfully transferred to the top layer; and for the input port of switch, the next output port and new VPI/VCI value should be found as soon as possible.

At the User-Network Interface (UNI), VPI and VCI takes 8 and 16 bits respectively. 12 and 16 bits are occupied at the Network-Network Interface (NNI). A total of 24 bits are used by UNI, and 28 bits are used by NNI. If the same size as the above-said total bits is directly used in the index table, $2^{24}$ (UNI) or $2^{28}$ (NNI) entries are needed for the Table. It means an extremely high cost in hardware, although related data can be directly indexed.

As a general, the VPI/VCI connection amount of each input port of ATM network will not exceed $2^{24}$ or $2^{28}$. Thus, there are usually two ways adopted by the receivers to recognize VPI/VCI connections. One is done by an Application Specific Integrated Circuit (ASIC) via the hashing method applied in computer science, the hardware used is more complicated, and the other uses Content Addressable Memory (CAM), which costs a lot in hardware. These two methods are not covered in the invention.

Figure 1:
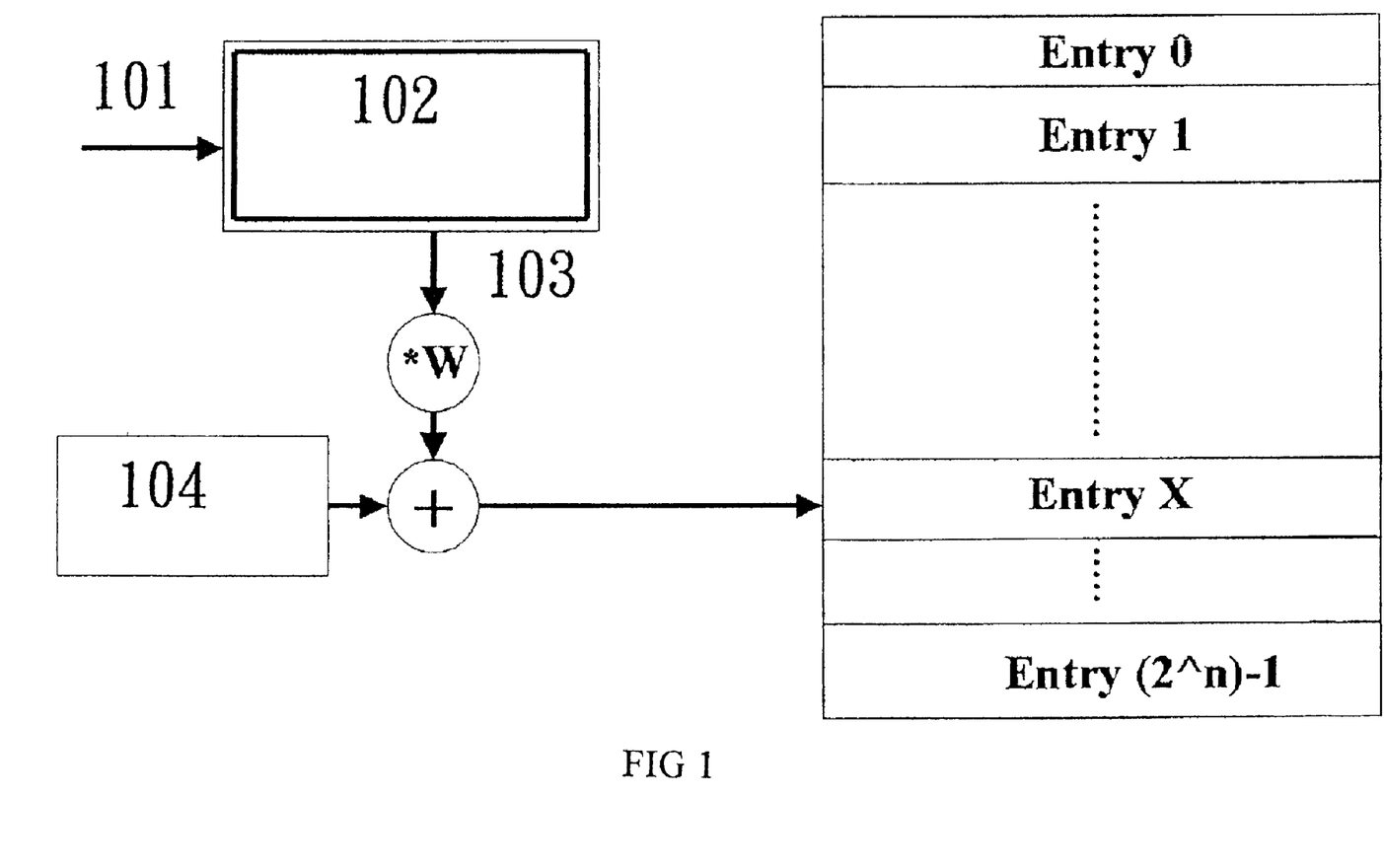
FIG. 1 illustration of VPI/VCI indexing applied at the ATM receivers.

The primary purpose of the invention is to study the theory of the indexing function, as shown in FIG. 1, illustration of VPI/VCI indexing applied at the ATM receivers. The VPI/VCI, used as input and calculated via an indexing function, produces an index value of n bits. Since the word of every data entry is W, the corresponding offset to the index table is obtained by n multiplied with W. According to the obtained offset value, adding up the base pointer for storing exact indexed data, corresponding indexed data entry can be found. Two usual and simple ways for application of the indexing function as shown in FIG. 1 are truncation and exclusive-OR.

Before looking into the truncation and exclusive-OR methods, we have to make clear that the methods for selection VPI/VCI for switches are as follows. First, the ceiling and bottom VCI values of an ATM are set and the VPI value is determined by the users as required; second, variable Least Significant Bits (LSB) for VPI and VCI are set.

The bits taken by VPI and VCI may be adjusted via an network interface card designed for ATMs using the truncation method, and may also be applied directly to the index in order to avoid obtaining the same index value through different VPI/VCI values, such a phenomenon is called collision. If an ATM, equipped with this kind of network card, both the switch and network interface card must be set to determine which bits will be used for indexing. However, the invention hereby presents a reverse compensation indexing method, and thus only the setting of switches has to be done. Here we would like to show the defects of the exclusive-OR method by the example below:

The following formula is used as an indexing value for those with 0·12 indexing bits in the exclusive-OR method:

$$(\{VPI[7:0], VCI[15:12]\} \oplus VCI[11:0]) \& (2^{TAB\_SIZE}-1)$$

which $\oplus$ represents the exclusive-OR of each bit, & represents the AND operation of each bit, and TAB_SIZE, an abbreviation of Table Size, represents the bit width of an index value.

To illustrate the inapplicable occasions of the exclusive-OR method, the following example is given:

If TAB_SIZE=7, the exclusive-OR indexing formula is $$(\{VPI[7:0], VCI[15:12]\} \oplus VCI[11.0]) \& (2^{TAB\_SIZE}-1)$$
$$= (\{VPI[7:0], VCI[15:12]\} \oplus VCI[11:0]) \& (2^7-1)$$
$$= (\{VPI[7:0], VCI[15:12]\} \oplus VCI[11:0]) \& (1111111)_2$$
$$= (\{VPI[2:0], VCI[15:12]\} \oplus VCI[6:0])$$

If ranges used by current VPI/VCI in ATM switches are:

$$\min(VPI)=0, \max(VPI)=0, \min(VCI)=0, \max(VCI)=127=(1111111)_2$$

then no collision of index values will occur. But as in the condition below:

$$\min(VPI)=0, \max(VPI)=1, \min(VCI)=0, \max(VCI)=63=(111111)_2$$

would result in at least one occasion that produces collisions:

(VPI/VCI)=(0/16), wherein the formula is:

$$\{VPI[2:0], VCI[15:12]\} \oplus VCI[6:0]$$
$$= (0010000)_2 \oplus (0000000)_2$$
$$= (0010000)_2$$

For another occasion that produces collisions: (VPI/VCI)=(1/0) the formula is:

$$\{VPI[2:0], VCI[15:12]\} \oplus VCI[6:0]$$
$$= (0010000)_2 \oplus (0000000)_2$$
$$= (0010000)_2$$

Apparently, at least one collision exists that both (0/16) and (1/0) index the same value.

In other words, if there is only one VPI in coordination with the above-said ATM switch without the exclusive-OR concept of the invention, it can only achieve at most the effect of "collision free" equivalent to the indexing bit width. Furthermore, if there are more than one VPI numbered in series, collisions will occur, because bit 0 of VPI (VPI[0]) are exclusive with variable bits of VCI (e.g. VCI [4] as said in the above example). Therefore, selection of suitable VPI number group can avoid occurrence of collisions, but the load of switch settings is increasing accordingly. This method of VPI number selection fits to the ATM switches using the first setting method said above, but for those using the second method, via setting of some lower Least Significant Bit (LSB), they are apparently not applicable with network interface cards with exclusive-OR functions.

To improve current ATM network's operating conditions, especially on prevention of collisions, an indexing method that corresponds the multi-sectional encoding structures to a single indexing table is proven in the next section of the invention. This indexing method can also be applied to the reverse compensation indexing method for VPI/VCI of multi-sectional encoding structures in ATM networks. We will illustrate the way that this flexible reverse compensation indexing method improves present conditions. Here in below, max stands for maximum, meaning a ceiling limit or the maximum value, and min stands for minimum, meaning a bottom limit or the minimum value. The remarkable feature of the Reverse Compensation Indexing Method is that if min(VPI)=0 and min(VCI)=0 and a same circuit can be used in:

$$\max(VPI) = 2^{k_0} - 1$$
$$\max(VCI) = 2^{n-k_0} - 1, \quad k_0 = 0, 1, \ldots, n$$

up to (n+1) occasions, all of which have the effect of "collision free." FIG 1. illustrates an executable VPI/VCI indexing method for ATM input terminals. The whole indexing method can be divided into three stages: operation of index values, production of addresses, and accessing of memory. If the time for operation of index values made as $t_i$, time for production of addresses as $t_a$, and time for accessing of memory is $t_m$, then the circuit for the Reverse Compensation Indexing Method applied in the entire indexing system can support a speed of processing $1/(t_i+t_a+t_m)$ ATM cells per second. If the time of exclusive-OR gate delay is $t_x$(by second), then $t_i=t_x$.

SUMMARY OF THE INVENTION

One purpose of the invention is to disclose the conception and implementation of a multi-sectional encoding structure corresponding to a single index table. This type of indexing can be completed after a short delay, and there will be no collisions if total bits used when changes occur in the encoding structure are equivalent to the bit width of the index table.

A second purpose of the invention is to disclose the reverse compensation indexing method is that min(VPI)=0 and min(VCI)=0 and a same circuit can be used in:

$$\max(VPI) = 2^{k_0} - 1$$
$$\max(VCI) = 2^{n-k_0} - 1, \quad k_0 = 0, 1, \ldots, n$$

up to (n+1) occasions, all of which have the benefit of "collision free."

In addition, the invention also discloses a method of correspondence of the multi-sectional encoding structure to the single index table. Especially the latter can more effectively adjust the connection amount of every input port when the size of the shared memory is fixed.

While the invention is susceptible to various modifications and alternative forms, certain illustrative embodiments thereof have been shown by way of example in the drawing and will herein be described in detail.

BRIEF DESCRIPTION OF THE DRAWINGS

The invention will now be described by way of example with reference to the accompanying figures in which.

Reference Number Of The Attached Drawings: 101 input 102 indexing function 103 n bits index value 104 base pointer 201 n bits subtractor 202 minuend 203 subtrahend 204 difference 401 Table Bit Width (TBW) bits indexing value 402 Table Bit Width (TBW)

DETAILED DESCRIPTION OF THE INVENTION

The invention is to make a theoretical exploration on correspondence of the multi-sectional encoding structure to a single index table, and to prove the features of the indexing method stated in the invention. Besides, the invention also studies the two-sectional encoding structure for VPI/VCI, resulting in the application flexibility of the reverse compensation indexing method. Examples of this indexing method applied in the receiving units of Asynchronous Transfer Mode (ATM) network equipment, like network interface cards, switches, etc., are given below.

If there is an m sectional encoding structure comprised of encoding structure values $\overline{A}_i^m$, i=0,1,. . . ,m−1., then each-of the encoding structure values $\overline{A}_i^m$ at most $2^{k_i}$ varieties, and $\overline{A}_i^m$ can be transferred into $\overline{A}_i^n$. Upon transference, $\overline{A}_i^n$ will have $k_i$ bits varied, and thus $$\sum_{i=0}^{m-1} k_i = n.$$

n stands for the index bit width of the indexing method, wherein $k_i$ affects the value of the total n. The value of $k_i$ varies with proficiency of transfer skills.

There are lots of ways to transfer $\overline{A}_i^m$ into $\overline{A}_i^n$. Here in the invention, two ways are presented for use, individual or mixed as required. The purpose of both methods is to minimize $k_i$, and thus decrease the index width n $$\left(\sum_{i=0}^{m-1} k_i = n\right).$$

For the first method, observe each $\overline{A}_i^m$, If the variable bits are not at the right side, adjust them.

The second method is fit to the following conditions: If the values of the encoding structure are $\min(\overline{A}_i^n) \leq \overline{A}_i^n \leq \max(\overline{A}_i^n)$, $k_i$, then satisfy the formula: $2^{k_i}-1<(\max(\overline{A}_i^n)-\min(\overline{A}_i^n)+1) \leq 2^{k_i}$. Add or subtract a certain value to or from the encoding structure value, $\overline{A}_i^m$, converting it into whose $k_i$ bits are transferable. A particular value for subtraction is $\min(\overline{A}_i^n)$.

$\overline{A}_i''$ operates with $(2^n-1)$ by AND bit by bit, can be adjusted into $\overline{A}_i'$ of n bit width.

Here upper-case letters stand for bits of fixed value, and lower-case letters for variable bits. If $\overline{A}_i'$ is transferred into $\overline{A}_o \oplus \overline{A}_1 \oplus \ldots \oplus \overline{A}_{m-1}$, then bits of $\overline{A}_i$, from $$n - \left(\sum_{j=0}^{i-1} k_j + 1\right) \text{ to } n - \sum_{j=0}^{i} k_j,$$

will become variable ones.

$$\left(\sum_{j=0}^{-1} k_j = 0 \text{ is assumed for short.}\right)$$

$\overline{A}_0^\varpi \oplus \overline{A}_1^\varpi \oplus \ldots \oplus \overline{A}_{m-1}^\varpi =$ $$\left(A_{m-1_{n-1}}, A_{m-1_{n-2}}, \ldots A_{m-1_{n-k_0}}, A_{0_{n-k_0-1}}, A_{0_{n-k_0-2}}, \ldots, A_{0_{n-\left(\sum_{i=0}^{m-2}k_0\right)}}, A_{0_{n-\left(\sum_{i=0}^{m-2}k_1\right)}}, A_{0_{n-\left(\sum_{i=0}^{m-2}k_i\right)-2}}, \ldots, A_{0_0}\right)$$

$\oplus$ $$\left(A_{1_{n-1}}, A_{1_{n-2}}, \ldots A_{1_{n-k_0}}, A_{m-1_{n-k_0-1}}, A_{m-1_{n-k_0-2}}, \ldots, A_{m-1_{n-\left(\sum_{i=0}^{m-2}k_i\right)}}, A_{1_{n-\left(\sum_{i=0}^{m-2}k_i\right)-1}}, A_{1_{n-\left(\sum_{i=0}^{m-2}k_i\right)-2}}, \ldots, A_{1_0}\right)$$

$\oplus$ $\vdots$ $\oplus$ $$\left(a_{0_{n-1}}, a_{0_{n-2}}, \ldots, a_{0_{n-k_0}}, a_{1_{n-k_0-1}}, a_{1_{n-k_0-2}}, \ldots, a_{1_{n-k_0-k_1}}, \ldots, a_{m-2_{n-\left(\sum_{i=0}^{m-2}k_i\right)}}, a_{m-1_{n-\left(\sum_{i=0}^{m-2}k_0\right)-1}}, a_{m-1_{n-\left(\sum_{i=0}^{m-2}k_0\right)-2}}, \ldots, a_{m-1_0}\right)$$

To make clear, all the variable bits in the above formula are adjusted to the bottom via the exchange law. (This step is make just to identify the property of "collision free," and need not be done while in implementation.)

$$\left(A_{m-1_{n-1}}, A_{m-1_{n-2}}, \ldots A_{m-1_{n-k_0}}, A_{0_{n-k_0-1}}, A_{0_{n-k_0-2}}, \ldots, A_{0_{n-\left(\sum_{i=0}^{m-2}k_0\right)}}, A_{0_{n-\left(\sum_{i=0}^{m-2}k_1\right)}}, A_{0_{n-\left(\sum_{i=0}^{m-2}k_i\right)-2}}, \ldots, A_{0_0}\right)$$

$\oplus$ $$\left(A_{1_{n-1}}, A_{1_{n-2}}, \ldots A_{1_{n-k_0}}, A_{m-1_{n-k_0-1}}, A_{m-1_{n-k_0-2}}, \ldots, A_{m-1_{n-\left(\sum_{i=0}^{m-2}k_i\right)}}, A_{1_{n-\left(\sum_{i=0}^{m-2}k_i\right)-1}}, A_{1_{n-\left(\sum_{i=0}^{m-2}k_i\right)-2}}, \ldots, A_{1_0}\right)$$

$\oplus$ $\vdots$ $\oplus$ $$\left(a_{0_{n-1}}, a_{0_{n-2}}, \ldots, a_{0_{n-k_0}}, a_{1_{n-k_0-1}}, a_{1_{n-k_0-2}}, \ldots, a_{1_{n-k_0-k_1}}, \ldots, a_{m-2_{n-\left(\sum_{i=0}^{m-2}k_i\right)}}, a_{m-1_{n-\left(\sum_{i=0}^{m-2}k_0\right)-1}}, a_{m-1_{n-\left(\sum_{i=0}^{m-2}k_0\right)-2}}, \ldots, a_{m-1_0}\right)$$

From the formula stated above, there is at least one different variable bit existing when two sections of bits are input with different values. As these two sections of bits are operated with m−1 fixed bits by exclusive-OR, the output value will have at least one bit different, compared between the two sections. Thus, it is asserted that input of different values, processed through the indexing method will produce different output, resulting with the required "collision free" effect.

Since the multi-sectional encoding indexing method can be applied to the two-sectional encoding VPI/VCI indexing method, a new reverse compensation indexing method, having the same "collision free" property as stated above, is developed to meet the application requirements, most convenient for the VPI/VCI regulated by the set parameters of minimum(VPI), maximum(VPI), minimum(VCI), and maximum(VCI). Here the method is presented as follows:

If there is a two-sectional encoding structure in $\overline{A}_i'''$, i=0, 1, the value of each encoding structure $\min(\overline{A}_i''') \leq \overline{A}_i''' \leq \max(\overline{A}_i''')$, $k_i$ then satisfy the formula: $2^{k_i-1} < (\max(\overline{A}_i''') - \min(\overline{A}_i''') + 1) \leq 2^{k_i}$ When each $\overline{A}_i'''$, added or subtracted with a certain value, is transferred, between which $\overline{A}_0''$ has $k_0$ variable bits and $\overline{A}_1''$ has $k_1$. And $$\sum_{i=0}^{m-1} k_i = n,$$

in which n is the width of the indexing bit.

$\overline{A}_i''$, operated with $(2^n-1)$ by AND bit by bit, is transferred into $\overline{A}_i'$ of n bit width.

$\overline{A}_0' = (A_{0_{n-1}}, A_{0_{n-2}}, \ldots, A_{0_{k_0}}, \alpha_{0_{k_0-1}}, \alpha_{0_{k_0-2}}, \ldots, \alpha_{0_0})$ $\overline{A}_1' = (A_{1_{n-1}}, A_{1_{n-2}}, \ldots, A_{1_{k_1}}, \alpha_{1_{k_1-1}}, \alpha_{1_{k_0-2}}, \ldots, \alpha_{1_0})$ Reversing the positions of $\overline{A}_0'$'s bits, we obtain $\overline{A}_0 = (\alpha_{0_0}, \alpha_{0_1}, \ldots, \alpha_{k_0-1}, A_{0k_0}, A_{0k_0+1}, \ldots, A_{0n-1})$ and then operated $\overline{A}_1 (=\overline{A}_1')$ by exclusive-OR, it turns out to be $(a_{0_0}, a_{0_1}, \ldots, a_{0_{k-1}}, A_{0_{k0+1}}, \ldots, A_{0_{n-1}})$ $\oplus$ $(A_{1_{n-1}}, A_{1_{n-2}}, \ldots, A_{1_{k_1}}, a_{1_{k_1-1}}, a_{1_{k_1-2}}, \ldots, a_{1_0})$ Since exclusive-OR operator meet with the exchange law, the above formula is adjusted by the law and becomes: (This step is make just to identify the property of "collision free," and will not be done while in implementation.)

$$(A_{1_{n-1}}, A_{1_{n-2}}, A_{1_n}, A_{0_{k_0}}, A_{0_{k_0+1}}, \ldots, A_{0_{n-1}})$$
$$\oplus$$
$$(a_{0_{n-2}}, a_{0_{n-2}}, \ldots, a_{0_{0-1}}, a_{1_{n-1}}, a_{1_{n-2}}, \ldots, a_{1_0})$$

From the above formula, $$\sum_{i=0}^{1} k_i = n,$$

two varied sets of input values mean that values of some bits are different. Therefore, the corresponding bit location of each output value may change. We assert that different input values, processed by the indexing method, will produce different output values, resulting with the effect of "collision free." Because all the bits of the above $\overline{A}_0'$ are reversed, this method is then called as the reverse compensation indexing method.

Some examples are given below to demonstrate the applications of the indexing method of the present invention in current ATM networks.

EXAMPLE 1

If the value of VPI/VCI is $\overline{A}_i'''$, and i=0,1, i.e. operated randomly in min(VPI), max(VPI), min(VCI), max(VCI) condition, we assume min(VPI)=7, max(VPI)=8, min (VCI)=1, max(VCI)=8 for the convenience of explanation.

Step 1:

The value of $k_0$, $k_1$, and n can be found by the following norm:

$$2^{k_0-1} < (\max(VPI) - \min(VPI) + 1) \leq 2^{k_0}$$
$$\Rightarrow 2^{k_0-1} < (8-7) + 1 \leq 2^{k_0}$$
$$\Rightarrow 2^{k_0-1} < 2 \leq 2^{k_0}$$
$$\Rightarrow k_0 = 1$$
$$2^{k_1-1} < (\max(VCI) - \min(VCI) + 1) \leq 2^{k_1}$$
$$\Rightarrow 2^{k_1-1} < (8-1) + 1 \leq 2^{k_1}$$
$$\Rightarrow 2^{k_1-1} < 8 \leq 2^{k_1}$$
$$\Rightarrow k_1 = 3$$

Width of the indexing bits $$n = \sum_{i=0}^{1} k_i = k_0 + k_1 = 1 + 3 = 4$$

Step 2:

Let $\overline{A}_0'' = \overline{A}_0''' + 1$ and $\overline{A}_1'' = \overline{A}_1''' - 1$ (applied also in the particular case presented in the above-said statement of the Multi-sectional Encoding Indexing Method), it is apparent that $\overline{A}_0'' = \overline{A}_0''' - \min(VPI), \overline{A}_1'' = \overline{A}_1''' - \min(VCI))$.

If $$8 \leq \vec{A}_0'' \leq 9 \Rightarrow (1000)_2 \leq \vec{A}_0'' \leq (1001)_2$$

only the right bit (i.e. the $k_0$ bit) of $\overline{A}_0''$ will change.

If $$0 \leq \vec{A}_1'' \leq 7 \Rightarrow (000)_2 \leq \vec{A}_1'' \leq (111)_2$$

that have three right bit (i.e. the $k_1$ bit) of $\overline{A}_1''$ will change.

Step 3:

$\overline{A}_0'', \overline{A}_1''$, both operated with $(2^n-1)=(2^4-1)=15=(1111)_2$ by AND bit by bit, is transferred into 4-bit $$\vec{A}_0' = (1, 0, 0, a_{0_0})_2 \Rightarrow (1, 0, 0, 0)_2 \leq \vec{A}_0' \leq (1, 0, 0, 1)_2$$
$$\vec{A}_1' = (0, a_{1_2}, a_{1_1}, a_{1_0})_2 \Rightarrow (0, 0, 0, 0)_2 \leq \vec{A}_1' \leq (0, 1, 1, 1)_2$$

Step 4

Reversing the locations of all $\overline{A}_0''$s bits, we obtain $\overline{A}_0 = (a_{0_0}, 0, 0, 1)_2$ and then operated with $\overline{A}_1(=\overline{A}_1')$ by the exclusive-OR, it turns out to be $$(a_{0_0}, 0, 0, 1)_2$$
$$\oplus$$
$$(0, a_{1_2}, a_{1_1}, a_{1_0})_2$$

Adjusted by the exchange law, the above formula becomes:

$$(0, 0, 0, 1)_2$$
$$\oplus$$
$$(a_{0_0}, a_{1_2}, a_{1_1}, a_{1_0})_2$$

Figure 2:
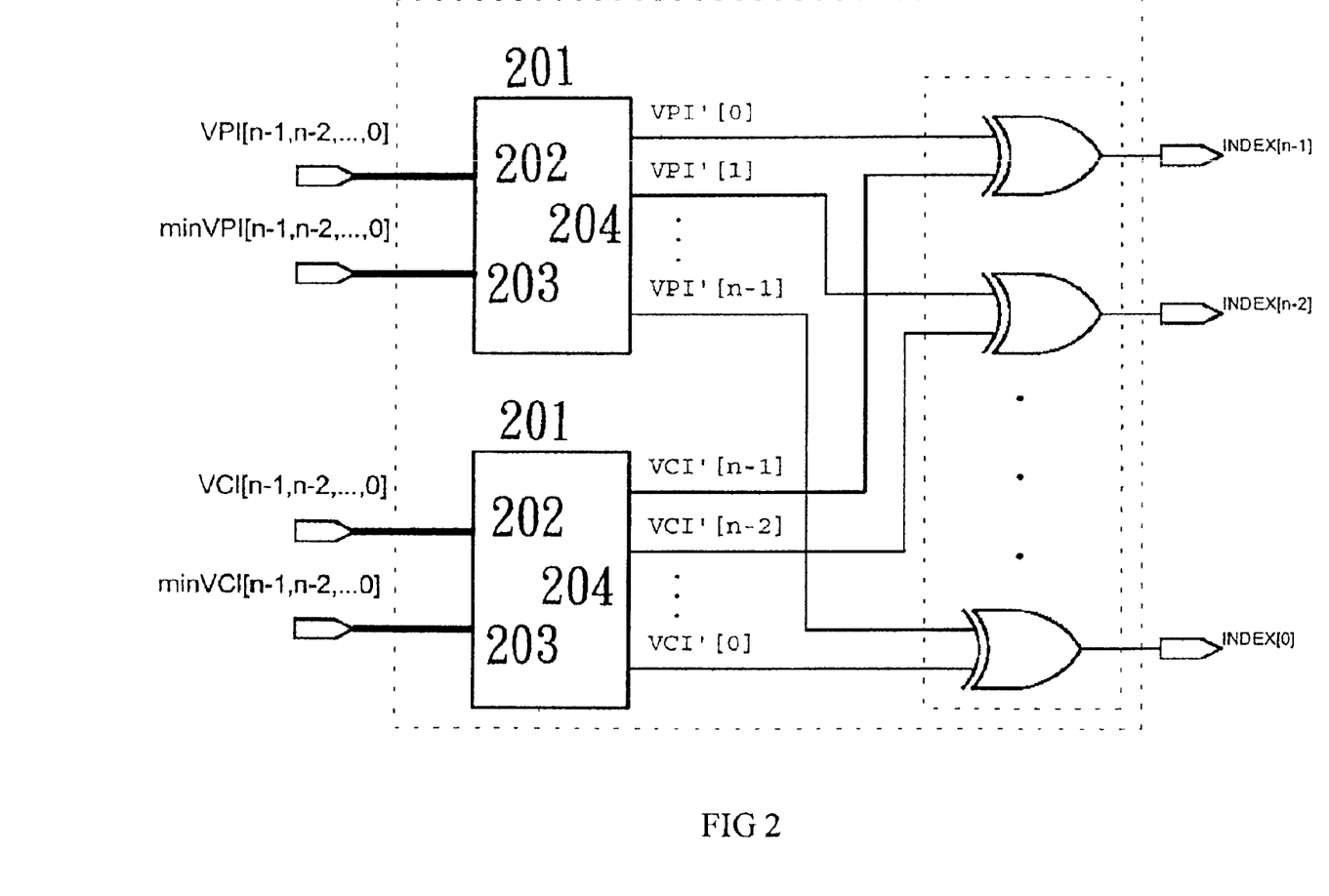
FIG. 2 illustrates a representative circuit used in the present invention.

From the above formula, we observe that the "collision free" effect of the index values is achieved. The circuit shown in FIG. 2 is for reference. If the delay time of the n-bit subtractor is $t_s$, and the exclusive or gate delay is $t_x$ (by second), then this indexing circuit, in coordination with the entire indexing method, is able to support the speed necessary for $1/(t_i+t_a+t_m)=1/(t_s+t_x+t_a+t_m)$ ATM cells, in which $t_i$ is the time for operating index values, $t_a$ for producing addresses, and $t_m$ for accessing the memory.

EXAMPLE 2

If the VPI/VCI value is $\overline{A}_i'''$, when i=0,1, i.e., $k_i$ bits of $\overline{A}_i''$ will change and $$\sum_{i=0}^{1} k_i = n,$$

for example min(VPI)=8, max(VPI)=9, min(VCI)=0 and max(VCI)=7.

Using the same indexing method as in Example 1, but omitting the process of addition or subtraction of $\overline{A}_0''', \overline{A}_1'''$ a certain value in Step 2, because lower $k_0$ and $k_1$ bits of the original $\overline{A}_0''$ and $\overline{A}_1''$ are varied, respectively. Please refer to Example 1 for details.

EXAMPLE 3

Example 3 is a special case of Example 2. It is used here to explain the outstanding property of the reverse compensation indexing method in some occasions:

Normally VPI and VCI will start from zero; therefore, we will check if there is any circuit that can meet with all the needs of the following occasions: min( VPI)=0, max(VPI)= $(2^{k_0}-1)$, min(VCI)=0, max(VCI)=$(2^{k_1}-1)$, where $$\sum_{i=0}^{1} k_i = n,$$

in which n is the width of the indexing bit.

If we reverse the bit locations of $\overline{A}_0{}'$ (i.e. VPI), then we can obtain $$\overline{A}_0 = (\alpha_{0_0}, \alpha_{0_{0k-1}}, 0, 0, \ldots, 0).$$

And operated with $\overline{A}_1 (= \overline{A}_1{}')$ (i.e. VCI) by exclusive-OR, it turns out to be $(a_{o_0}, a_{o_1}, \ldots, a_{o_{k0-1}}, 0, 0, \ldots, 0)$ $\oplus$ $(0, 0, \ldots, 0, a_{1_{n-1}}, a_{1_{n-2}}, \ldots, a_{1_0})$ From the above formula, it is apparent that "collision free" effect of index values can be achieved because all variable bits operate with 0 by exclusive-OR.

To put it this way, the outstanding property of the reverse compensation indexing method to be illustrated in Example 3 is: if min (VPI)=0 and min (VCI)=0, then the same circuit can be applied in $$\max(VPI) = 2^{k_0} - 1$$
$$\max(VCI) = 2^{n-k_0} - 1, \quad k_0 = 0, 1, \ldots, n$$

up to (n+1) occasions, all of which have the effect of "collision free."

Figure 3:
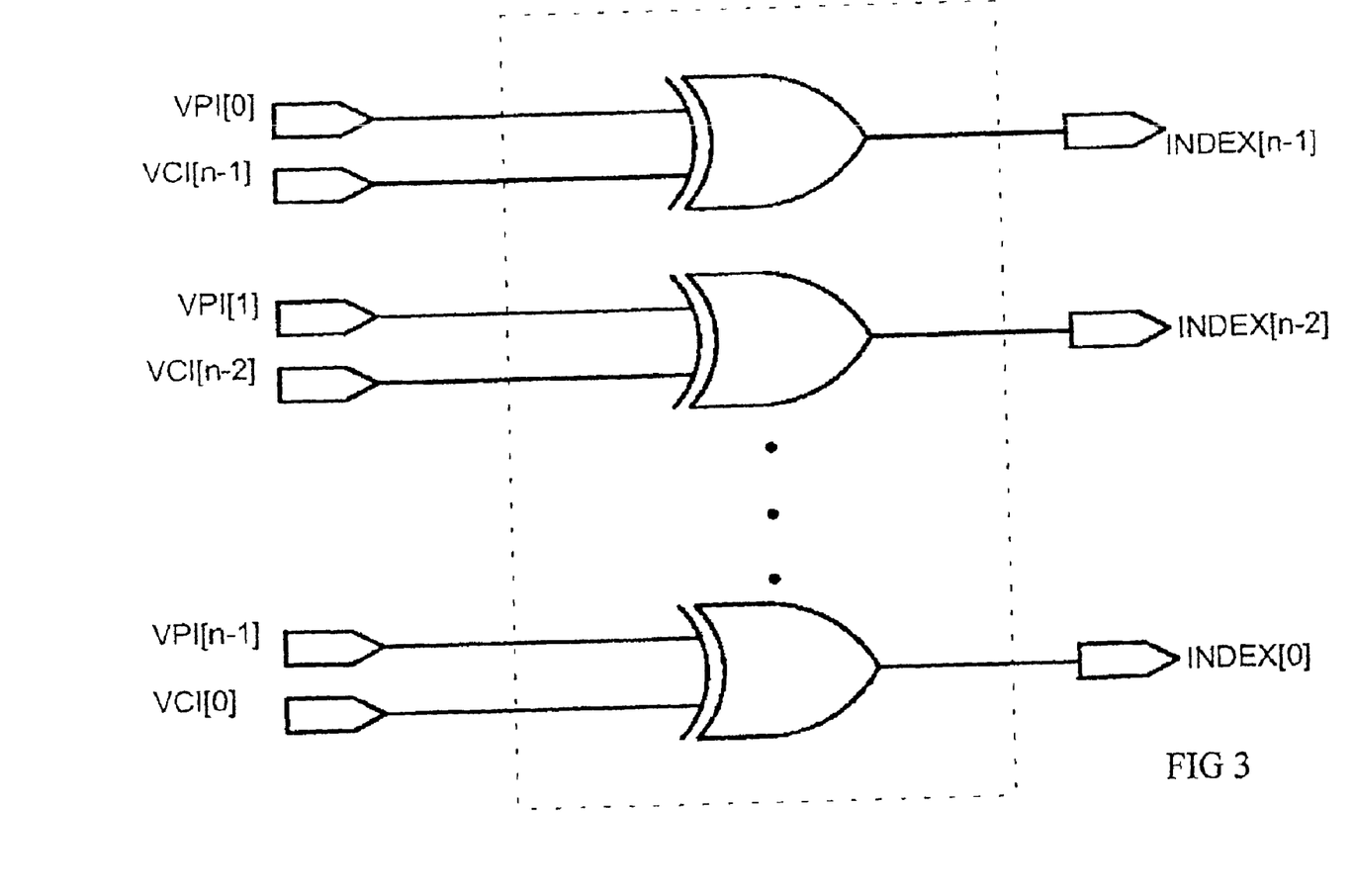
FIG. 3 shows the usage of 8 binary exclusive-OR gate circuits.

Here a simple example is given as shown in FIG. 3. If n=8, i.e. the circuit shown in FIG. 3 uses 8 exclusives-OR gates of binary input, then there are up to nine conditions that all have "collision free" effect:

In the first condition, max (VPI)=0, max (VCI)=255.
In the second condition, max(VPI)=1, max(VCI)=127.
In the third condition, max(VPI)=3, max(VCI)=63.
In the fourth condition, max(VPI)=7, max(VCI)=31.
In the fifth condition, max(VPI)=15, max(VCI)=15.
In the sixth condition, max(VPI)=31, max(VCI)=7.
In the seventh condition, max(VPI)=63, max(VCI)=3.
In the eighth condition, max(VPI)=127, max(VCI)=1.
In the ninth condition, max(VPI)=255, max(VCI)=0.

The reference circuit as shown in FIG. 3 can be applied both in Example 2 and Example 3, and can complete the operation of indexing in an exclusive-OR gate delay time. If operated in the entire indexing system, the circuit of the Reverse Compensation Indexing Method can support up to $1/(t_i+t_o+t_m)$ of ATM cells in a second, if the delay of exclusive-OR gate is $t_x$ (by second), then $t_i=t_x$, wherein $t_i$ is the time for operation of index values, $t_o$ is the time for production of addresses, and $t_m$ is the time of memory accessing.

Figure 4:
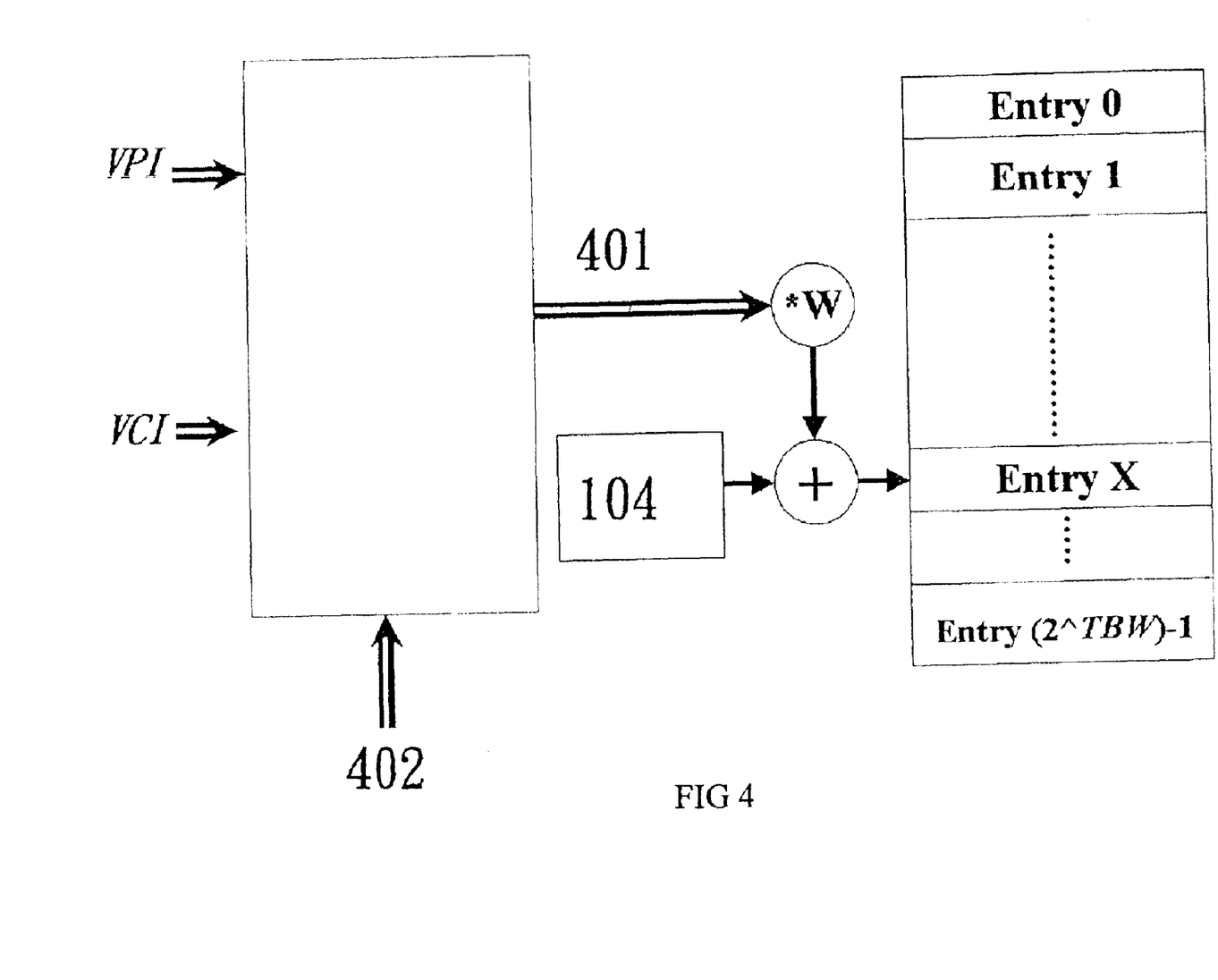
FIG. 4 illustrates the Table Bit Width Adjuster (TBWA) circuit

The receiving unit of the ATM can support different VPI/VCI connection amounts by relatively adding or subtracting the indexing table memory equipped in the said unit, in coordination with the Table Bit Width Adjuster (TBWA) circuit as shown in FIG. 4. The input exclusive-OR configuration of VPI and VCI may be changed according to the bit width of the indexing table memory. For instance, if Table Bit Width (TBW)=3, then the exclusive-OR configuration of VPI[0], VIP[1] and VPI[2] will operate with VCI[2], VCI[1] and VPI[0] respectively by exclusive-OR. If TBW=4, then the exclusive-OR configuration of VPI[0], VPI[1], VPI[2] and VPI[3] must respectively operate with VCI[3], VCI[2], VCI[1] and VCI[0] by exclusive-OR.

Figure 5:
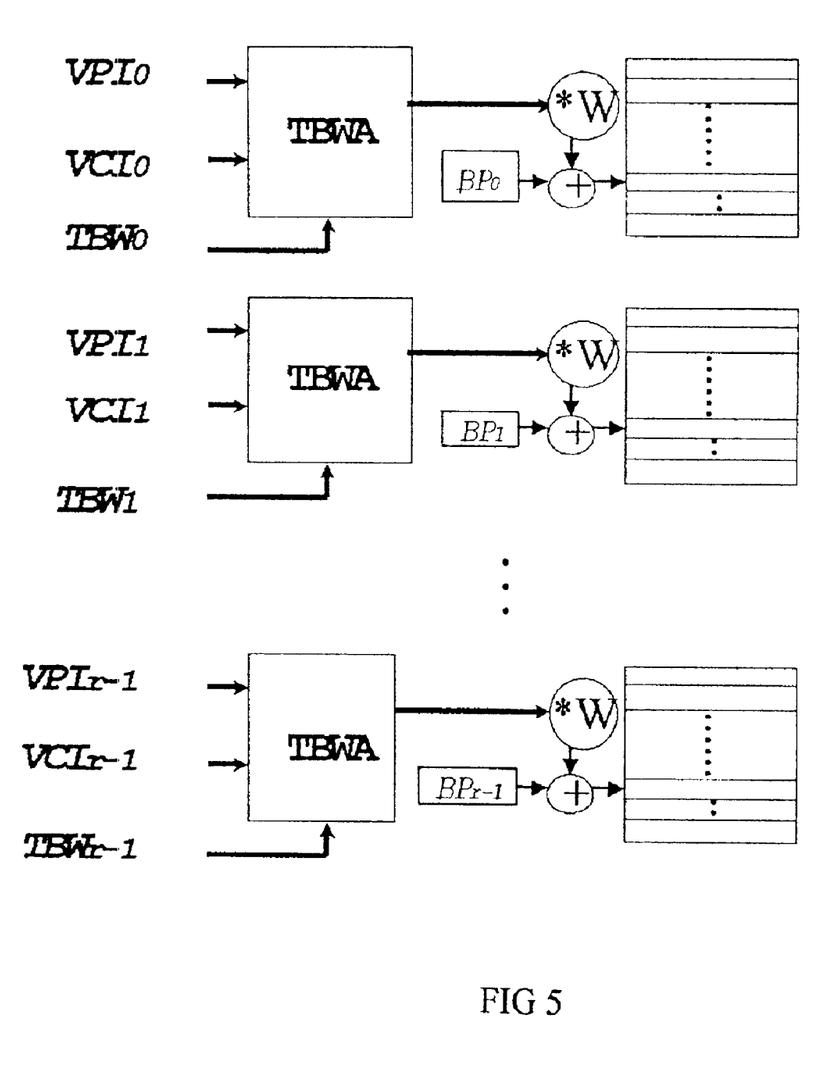
FIG. 5 shows index circuit of the switch with r (from 0 to r−1) input ports.

Next we will describe how to apply the indexing method of the present invention in the input port of an ATM switch in order to find the next output ports and new VPI/VCI values. An ATM switch has two or more input ports, on which the circuit as shown in FIG. 4 can be applied. The following circuit as shown in FIG. 5 is an indexing circuit for the switch of input r ports (numbered from 0 to r−1). The base pointer of the indexing table of each input port is $BP_i$, i=0,1, . . . ,r−1. BP is an abbreviation for base pointer. However, since each port uses its own indexing table as shown in FIG. 5, other ports cannot flexibly support it if its connection amount exceeds the original setting for the Indexing Table Memory after the whole system is completely configured, though other ports still have empty indexing table memory. To solve this problem, we present a structure shown in FIG. 6.

Figure 6:
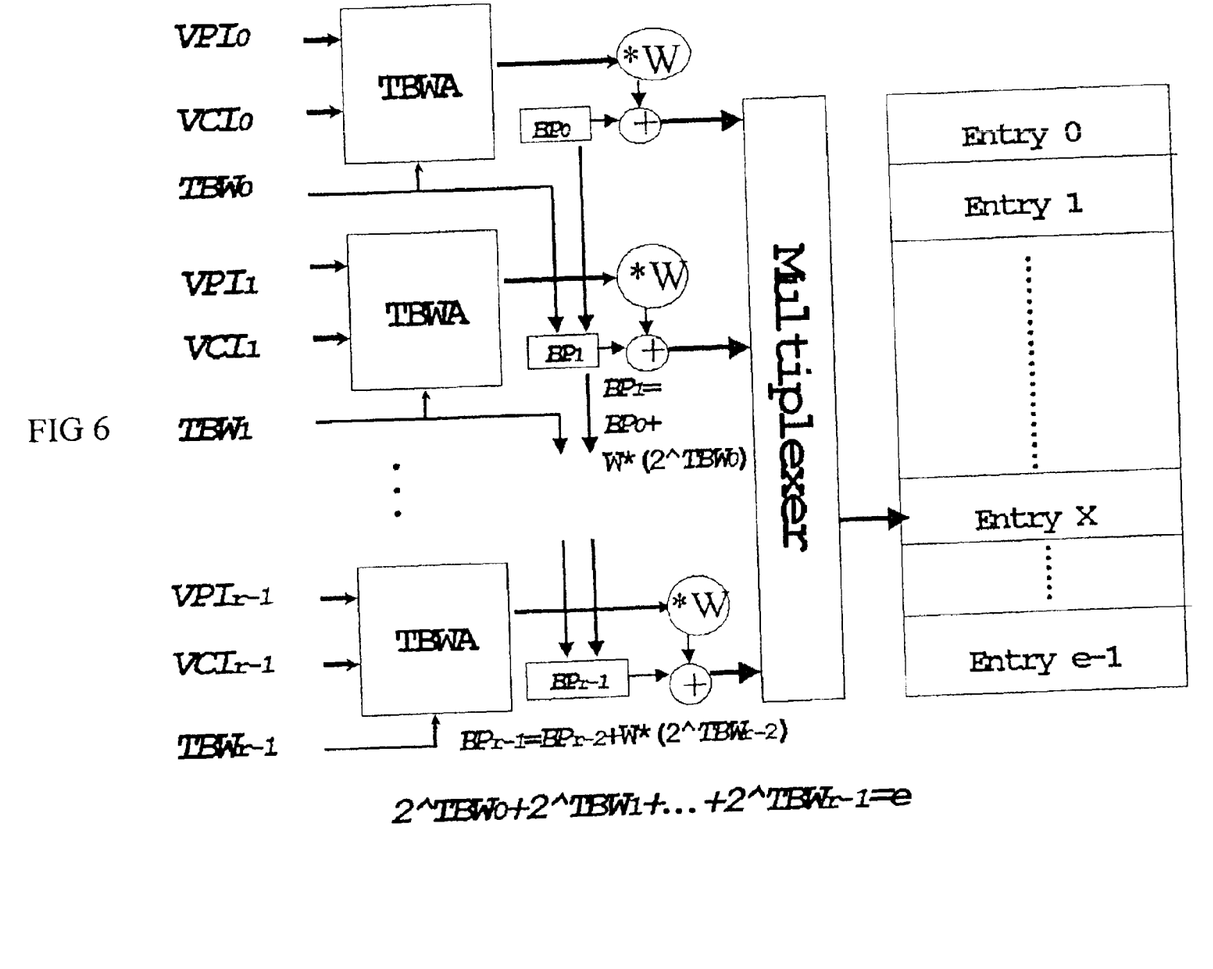
FIG. 6 shows the architecture of the switch with shared index memory.
Figure 7:
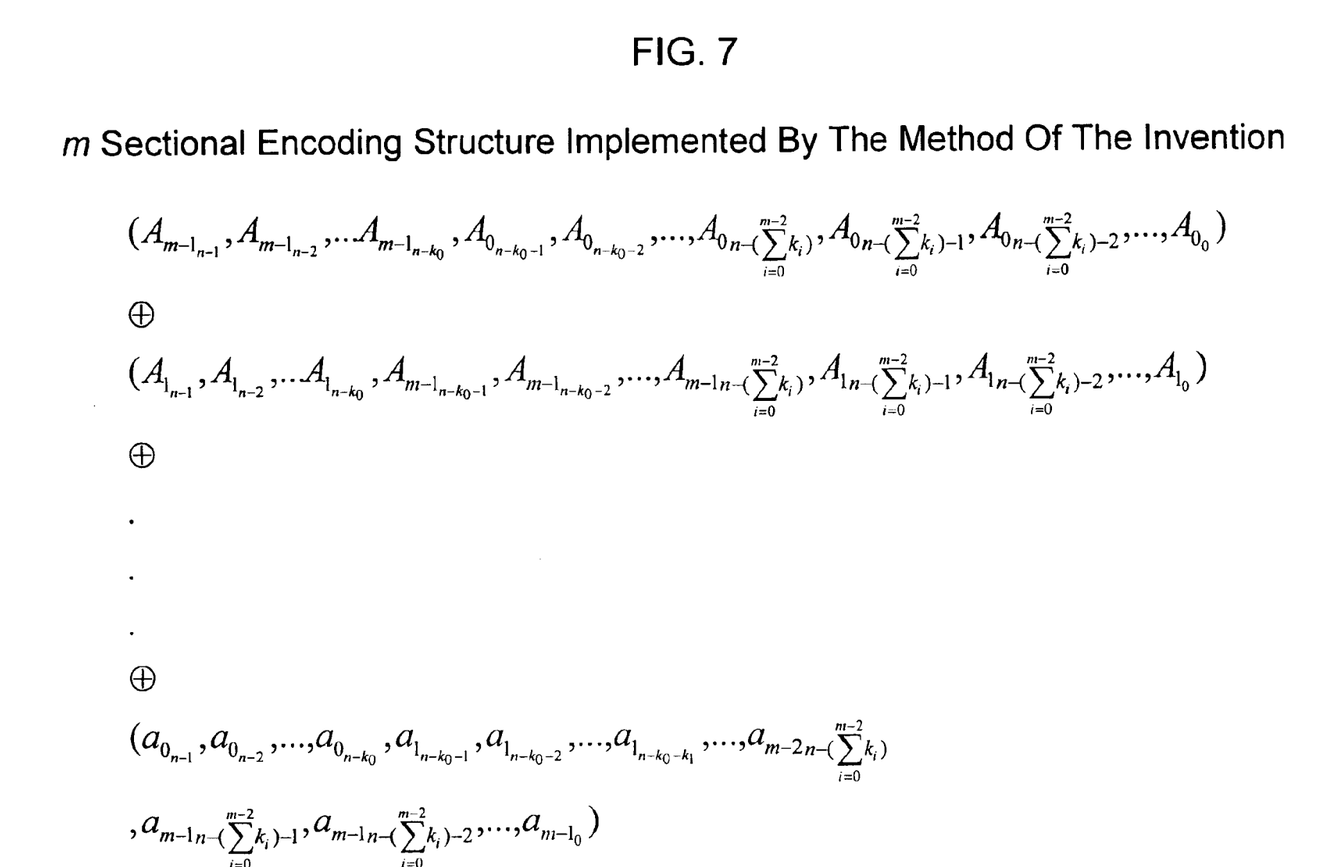
FIG. 7 shows an m sectional encoding structure implemented by the method of the invention.
Figure 8:
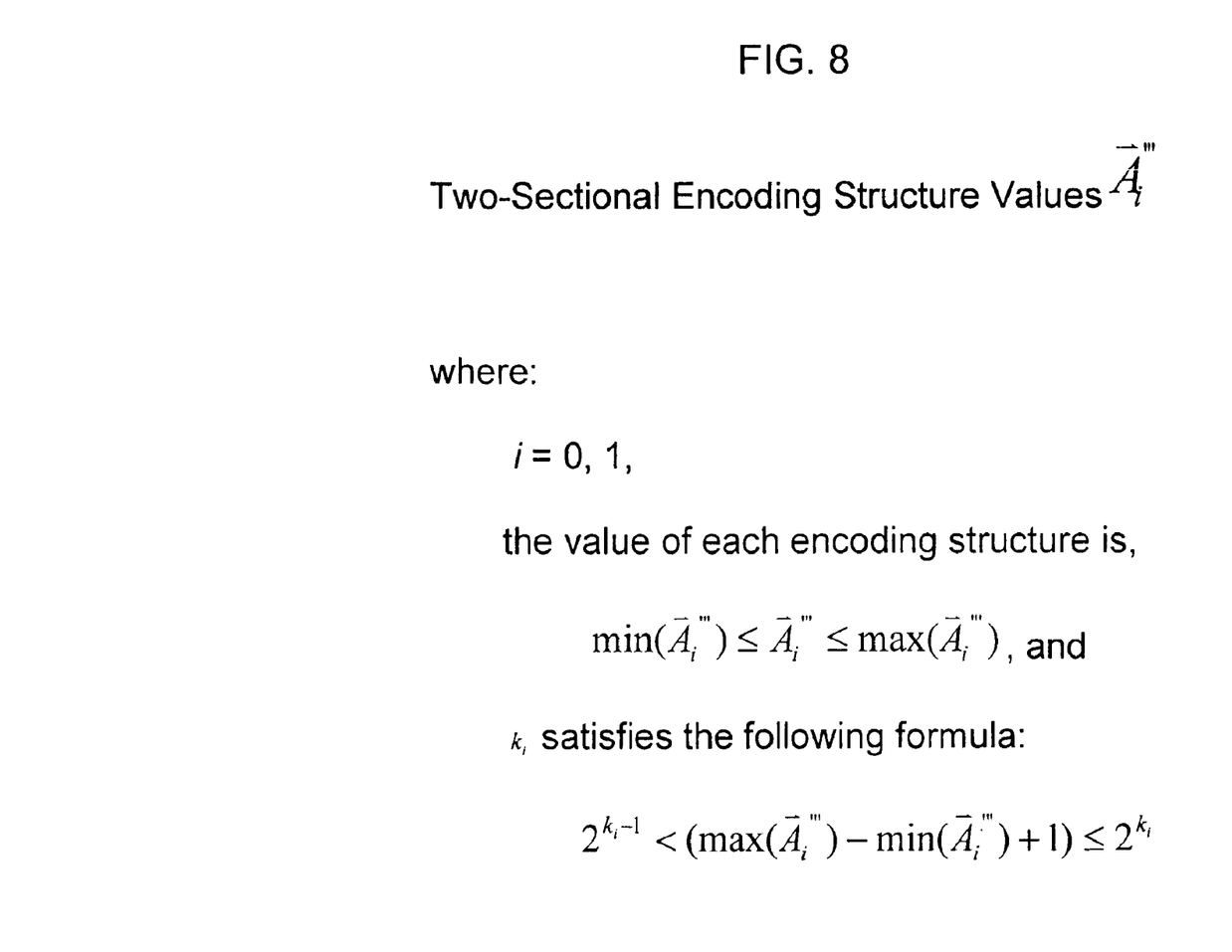
FIG. 8 shows a two-sectional encoding structure values $-A^{M}$.

At the right side of the FIG. 6, the indexing table memory has e entries, numbered from Entry 0, Entry 1, . . . to Entry e−1.

$$\sum_{i=0}^{r-1} 2^{TBW_i} = e,$$

the base pointer of the 0 input unit is $BP_0$, and those of the base pointer for other r−1 input ports is figured out by the Table Bit Width (TBW) and Base Pointer (BP) of the previous input unit. Its formula is $BP_i = BP_{i-1} + W^* 2^{TBW_{i-1}}$, i =1, . . . , r−1. The purpose of calculating every Base Pointer (BP) is to orderly and compatibly allocate every section of the indexing table memory used by different input ports. Such a shared memory structure can more effectively adjust the connection amount of every input port with limited indexing table memory.

In view of the invention as described above, one can easily infer the way to apply the reverse compensation indexing method in multi-sectional encoding structures, making this kind of structures more flexible in use. All sections of a multi-sectional encoding structure are divided into sets of two sections, and every set is regarded as a basic unit for implementing the reverse compensation indexing method. Therefore, this kind of multi-sectional encoding structure may have the same flexibility necessary for application of the reverse compensation indexing method.

To sum up, the present invention is creative and innovative. Although we have presented some better examples as shown above, the applications of the invention are not limited to those examples. Anyone who is familiar with the techniques described is able to design corresponding circuits with the multi-sectional encoding indexing method and the reverse compensation indexing method with some changes or amendments without deviating the spirit and coverage of the invention.

What is claimed is:

1. A method of implementing a multi-sectional encoding indexing method, comprising the steps of:

providing an m sectional encoding structure including encoding structure values $\overline{A}_i{}'''$, with each of the encoding structure values $\overline{A}_i{}'''$ having at most $2_2{}^i$ varieties;

transferring the encoding structure values $\overline{A}_i{}'''$ into n encoding structure values $\overline{A}_i{}''$ whereupon the encoding structure values $\overline{A}_i{}''$ will have $k_i$ bits varied, and thus the summation of the $k_i$ bits associated with the encoding structure values is equal to n, $$\left(\sum_{i=0}^{m-1} k_i = n\right),$$

wherein n stands for an index bit width of the multi-sectional encoding indexing method;

adjusting the encoding structure values $\overline{A}_i''$ into encoding structure values $\overline{A}_i'$ by using a bit-by-bit AND operation with $(2^n-1)$ the encoding structure values $\overline{A}_i'$ having an n bit width; and determining whether or not the encoding structure values $\overline{A}_i'$ are transferred into $\overline{A}_0 \oplus \overline{A}_1 \oplus ... \oplus \overline{A}_{m-1}$, and if the encoding structure values $\overline{A}_i'$ are transferred into the $\overline{A}_0 \oplus \overline{A}_1 \oplus ... \oplus \overline{A}_{m-1}$, then bits of $\overline{A}_i$, from $$n - \left(\sum_{j=0}^{i-1} k_j + 1\right)$$

to $$n - \sum_{j=0}^{i} k_j,$$

will become variable ones, wherein $$\sum_{j=0}^{-1} k_j = 0$$

and the $\overline{A}_0 \oplus \overline{A}_1 \oplus ... \oplus \overline{A}_{m-1}$, has a characteristic that different output values can be produced as long as the values inputted vary, and have a collision free effect.

2. The method of implementing a multi-sectional encoding indexing method, according to the claim 1, wherein the transferring step is applied individually or mixed, and in both cases, the $k_i$ are minimized, thereby shortening the index n bit width, in which, $$\sum_{i=0}^{m-1} k_i = n.$$

3. The method of implementing a multi-sectional encoding indexing method, according to the claim 1, wherein the transferring step includes observing each of the encoding structure values $\overline{A}_i''$, and if the variable bits are not at a right side, adjusting the bits.

4. The method of implementing a multi-sectional encoding indexing method, according to the claim 1, the transferring step is applied under conditions when:

$\min(\overline{A}_i''') \leq \overline{A}_i''' \leq \max(\overline{A}_i''')$, and $k_i$ satisfies the formula:

$$2^{k_i-1} < (\max(\overline{A}_i'') - \min(\overline{A}_i'') + 1) \leq 2^{k_i},$$

performing the step of adding or subtracting a certain value to or from the encoding structure value, $\overline{A}_i''$, thereby converting the $k_i$ bits that are variable, wherein the certain value for subtraction is $\min(\overline{A}_i'')$.

5. An implementation method of a reverse compensation indexing method, comprising the steps of:

providing a two-sectional encoding structure is including encoding structure values $\overline{A}_i''$ where i=0, 1, and the value of each encoding structure is $\min(\overline{A}_i''') \leq \overline{A}_i''' \leq \max(\overline{A}_i''')$, wherein $k_i$ satisfies the following formula:

$$2^{k_i-1} < (\max(\overline{A}_i'') - \min(\overline{A}_i'') + 1) \leq 2^{k_i};$$

adding or subtracting a certain value to or from the encoding structure values $\overline{A}_i''$, and after adding or subtracting a certain value to or from the encoding structure values $\overline{A}_i''$, $k_o$ bits of an encoding structure values $\overline{A}_0'$ and $k_1$ bits of the encoding structure values $\overline{A}_i''$ change, wherein $$\sum_{i=0}^{1} k_i = n,$$

in which n is a width of the index bits;

adjusting the encoding structure values $\overline{A}_i''$ into encoding structure values $\overline{A}_i'$ by using a bit-by-bit AND operation with $(2^n-1)$ the encoding structure values $\overline{A}_i'$ having n bits;

obtaining $\overline{A}_0$ by reversing the bits of $\overline{A}_i'$; and operating on $\overline{A}_0$ with $\overline{A}_1(=\overline{A}_1')$ by exclusive-OR, $(\overline{A}_0 \oplus \overline{A}_1)$, thereby producing output values which are different if different values are inputted and have a collision free effect.

6. The method of implementing a reverse compensation indexing method; according to the claim 5, wherein if min(VPI)=0 and min(VCI)=0, then a single circuit can be applied in $$\begin{aligned}\max(VPI) &= 2^{k_0} - 1 \\ \max(VCI) &= 2^{n-k_0} - 1,\end{aligned} \quad k_0 = 0, 1, \ldots, n$$

up to (n+1) occasions, all of which have the collision free effect.

7. A structure implementing multi-sectional encoding structures in a shared memory structure of an Asynchronous Transfer Mode (ATM) switch, comprising the step of:

providing a Table Bit Width Adjuster (TBWA) circuit with multiple input ports r, and an indexing table memory, the indexing table memory have sections for e entries, from Entry 0 to Entry e-1, wherein Entry 0, Entry 1, . . . to Entry e-1, and $$\sum_{i=0}^{r-1} 2^{TBW_i} = e,$$

wherein a base pointer (BP) of an input unit 0 is $BP_0$, and input units of base pointers for other r-1 input ports is determined by the Table Bit Width (TBW) and Base Pointer (BP) of the previous unit, using a formula:

$$BP_i = BP_{i-1} + W^* 2^{TBW_{i-1}}, i=1, \ldots, r-1,$$

wherein every base pointer is calculated in order to compatibly allocate every section of the indexing table memory used by different input ports whereby the shared memory structure effectively adjusts a connection amount of every input port, thereby minimizing an amount of indexing table memory which is required.

* * * * *